United States Patent
Basu et al.

(10) Patent No.: US 11,144,473 B2
(45) Date of Patent: Oct. 12, 2021

(54) QUALITY OF SERVICE FOR INPUT/OUTPUT MEMORY MANAGEMENT UNIT

(71) Applicant: Advanced Micro Devices, Inc., Santa Clara, CA (US)

(72) Inventors: Arkaprava Basu, Bangalore (IN); Michael LeBeane, Austin, TX (US); Eric Van Tassell, San Marcos, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 317 days.

(21) Appl. No.: 16/007,027

(22) Filed: Jun. 13, 2018

(65) Prior Publication Data

US 2019/0384722 A1    Dec. 19, 2019

(51) Int. Cl.
*G06F 12/1036* (2016.01)
*G06F 12/1009* (2016.01)
(Continued)

(52) U.S. Cl.
CPC ........ *G06F 12/1036* (2013.01); *G06F 9/4881* (2013.01); *G06F 9/5011* (2013.01);
(Continued)

(58) Field of Classification Search
CPC .............. G06F 1/00–3296; G06F 3/00; G06F 3/06–0689; G06F 5/00–16;
(Continued)

(56) References Cited

U.S. PATENT DOCUMENTS

| 4,763,250 A * | 8/1988 | Keshlear | G06F 12/1009 711/206 |
| 5,113,522 A * | 5/1992 | Dinwiddie, Jr. | G06F 11/1641 713/2 |

(Continued)

OTHER PUBLICATIONS

Z. Zhang, J. Han, B. Li, W. Zhou and D. Meng, "Lynn: A Multi-dimensional Dynamic Resource Management System for Distributed Applications in Clouds," 2013 International Conference on Cloud and Service Computing, 2013, pp. 84-91 (Year: 2013).*

(Continued)

*Primary Examiner* — Daniel C. Chappell
(74) *Attorney, Agent, or Firm* — Polansky & Associates, P.L.L.C.; Paul J. Polansky; Rosalynn M. Smith

(57) ABSTRACT

A data processing system includes a memory, a group of input/output (I/O) devices, an input/output memory management unit (IOMMU). The IOMMU is connected to the memory and adapted to allocate a hardware resource from among a group of hardware resources to receive an address translation request for a memory access from an I/O device. The IOMMU detects address translation requests from the plurality of I/O devices. The IOMMU reorders the address translation requests such that an order of dispatching an address translation request is based on a policy associated with the I/O device that is requesting the memory access. The IOMMU selectively allocates a hardware resource to the input/output device, based on the policy that is associated with the I/O device in response to the reordering.

20 Claims, 6 Drawing Sheets

(51) Int. Cl.
*G06F 9/50* (2006.01)
*G06F 9/48* (2006.01)
*G06F 13/16* (2006.01)
*G06F 13/22* (2006.01)

(52) U.S. Cl.
CPC ...... *G06F 12/1009* (2013.01); *G06F 13/1626* (2013.01); *G06F 13/1642* (2013.01); *G06F 13/225* (2013.01); *G06F 2212/681* (2013.01)

(58) Field of Classification Search
CPC ........... G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2003/0691–0698; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; H04L 9/00–38; H04L 12/00–66; H04L 41/00–5096; H04L 49/00–9094; H04L 61/00–6095; H04L 67/00–42

See application file for complete search history.

(56) References Cited

U.S. PATENT DOCUMENTS

| | | | | | |
|---|---|---|---|---|---|
| 5,369,749 | A * | 11/1994 | Baker | ............... | G06F 15/17 710/1 |
| 5,838,968 | A * | 11/1998 | Culbert | ............ | G06F 9/5011 718/104 |
| 7,437,727 | B2 * | 10/2008 | Leong | ............ | G06F 3/0601 710/24 |
| 7,529,836 | B1 * | 5/2009 | Bolen | ............ | G06F 3/0611 709/226 |
| 7,539,991 | B2 * | 5/2009 | Leong | ............ | G06F 3/061 711/114 |
| 7,546,405 | B2 * | 6/2009 | Terakawa | ............ | G06F 9/5011 710/116 |
| 7,613,897 | B2 * | 11/2009 | Armstrong | ............ | G06F 9/5077 711/173 |
| 9,098,203 | B1 * | 8/2015 | Kedem | ............ | G06F 3/061 |
| 9,276,665 | B1 * | 3/2016 | Johnson | ............ | H04B 7/18595 |
| 10,013,264 | B2 * | 7/2018 | Jacobs | ............ | G06F 9/45558 |
| 10,372,493 | B2 * | 8/2019 | Dhanraj | ............ | G06F 9/4881 |
| 10,642,501 | B1 * | 5/2020 | Patel | ............ | G06F 9/4411 |
| 10,678,480 | B1 * | 6/2020 | Armangau | ............ | G06F 3/067 |
| 10,686,724 | B2 * | 6/2020 | Gulati | ............ | G06F 9/45558 |
| 10,853,277 | B2 * | 12/2020 | Liang | ............ | G06F 13/1668 |
| 2002/0166038 | A1 * | 11/2002 | MacLeod | ............ | G06F 12/1027 711/202 |
| 2008/0225786 | A1 * | 9/2008 | Han | ............ | H04W 72/14 370/329 |
| 2008/0250415 | A1 * | 10/2008 | Lllikkal | ............ | G06F 9/5094 718/103 |
| 2009/0182605 | A1 * | 7/2009 | Lappas | ............ | G06Q 10/06 705/34 |
| 2010/0122062 | A1 * | 5/2010 | Hummel | ............ | G06F 12/1081 711/205 |
| 2012/0246381 | A1 * | 9/2012 | Kegel | ............ | G06F 12/109 711/6 |
| 2014/0075123 | A1 * | 3/2014 | Hildesheim | ............ | G06F 12/1027 711/133 |
| 2014/0208064 | A1 * | 7/2014 | Basu | ............ | G06F 12/10 711/207 |
| 2015/0046656 | A1 * | 2/2015 | Blinick | ............ | G06F 12/0848 711/129 |
| 2015/0067296 | A1 * | 3/2015 | Basu | ............ | G06F 12/1009 711/206 |
| 2016/0232106 | A1 * | 8/2016 | Chakrala | ............ | G06F 12/1027 |
| 2017/0277639 | A1 * | 9/2017 | Awad | ............ | G06F 12/1036 |
| 2017/0337136 | A1 * | 11/2017 | Basu | ............ | G06F 12/0837 |
| 2017/0371720 | A1 * | 12/2017 | Basu | ............ | G06F 9/4881 |
| 2018/0069767 | A1 * | 3/2018 | Basu | ............ | G06F 9/5011 |
| 2018/0253236 | A1 * | 9/2018 | Gadelrab | ............ | G06F 3/0613 |
| 2019/0087089 | A1 * | 3/2019 | Yoshida | ............ | G06F 12/0246 |
| 2019/0155750 | A1 * | 5/2019 | Wang | ............ | G06F 12/0811 |
| 2019/0196978 | A1 * | 6/2019 | Basu | ............ | G06F 9/3004 |
| 2019/0220301 | A1 * | 7/2019 | Zheng | ............ | G06F 9/45558 |

OTHER PUBLICATIONS

Gauhar Eram Shaikh and U. Shrawankar, "Dynamic memory allocation technique for virtual machines," 2015 IEEE International Conference on Electrical, Computerand Communication Technologies (ICECCT), 2015, pp. 1-6 (Year: 2015).*

Yuejian Xie, Gabriel H. Lo; "PIPP: Promotion/Insertion Pseudo-Partitioning of Multi-Core Shared Caches"; 36th International Symposium on Computer Architecture; Jun. 20-24, 2009; Austin, TX; United States; 10 pages.

Daniel Sanchez, Christos Kozyrakis; "Vantage: Scalable and Efficient Fine-Grain Cache Partitioning"; 38th International Symposium on Computer Architecture; Jun. 4-8, 2011; San Jose, CA; United States; 12 pages.

Nosayba El-Saved, Anurug Mukkara, Po-An Tsai, Harshad Kasture, Xiaosong Ma, Daniel Sanchez; "KPart: A Hybrid Cache Partitioning-Sharing Technique for Commodity Multicores"; 24th International Symposium on High Performance Computer Architecture; Feb. 24-28, 2018; Vienna, Austria; 14 pages.

Jan Vesely, Arkaprava Basu, Mark Oskin, Gabriel H. Loh, Abhishek Bhattacharjee; "Observations and Opportunities in Architecting Shared Virtual Memory for Heterogeneous Systems"; IEEE International Symposium High Performance Analysis of Systems and Software (ISPASS); Apr. 2016; 11 pages.

Bharath Pichai, Lisa Hsu, Abhishek Bhattacharjee; "Architectural Support for Address Translation on GPUs"; ASPLOS '14 Proceedings of the 19th international conference on Architectural support for programming anguages and operating systems; Apr. 2014; 15 pages.

Niladrish Chatterjee, Mike O'Connor, Gabriel H. Loh, Nuwan Jayasena, Rajeev Balasubramonian; "Managing DRAM Latency Divergence in Irregular GPGPU Applications"; SuperComputing Conference and Expo (SC14); Nov. 2014; 12 pages.

Jason Power, Mark D. Hill, David A. Wood; "Supporting x86-64 Address Translation for 100s of GPU Lanes"; 20th IEEE International Symposium on High Performance Computer Architecture (HPCA'14); Feb. 2014; 12 pages.

* cited by examiner

| IOMMU DEVICE TABLE 600 | | | | | | |
|---|---|---|---|---|---|---|
| I/O DEVICE 602 | ATTRIBUTE A 604 | ... | ATTRIBUTE N 606 | HARDWARE RESOURCE A % 608 | HARDWARE RESOURCE B % 610 | L2 TLB HIT RATE 612 |
| A | | | | | | |
| B | | | | | | |
| C | | | | | | |
| ... | | | | | | |
| N | | | | | | |

*FIG. 6*

QUALITY OF SERVICE FOR INPUT/OUTPUT MEMORY MANAGEMENT UNIT

STATEMENT REGARDING FEDERALLY SPONSORED RESEARCH OR DEVELOPMENT

This invention was made with United States government support under the PathForward Project with Lawrence Livermore National Security (Prime Contract No. DE-AC52-07NA27344, Subcontract No. B620717) awarded by the Department of Energy (DOE). The United States government has certain rights in this invention.

BACKGROUND

A system on a chip or system on chip (SoC or SOC) is an integrated circuit that integrates all components of a computer or other electronic system into a single chip. Many input/output (I/O) devices, both on the SoC and outside the chip, need to access system memory, for example dynamic random-access memory (DRAM). These include, but are not limited to graphics processing units (GPUs), network interface controllers (NICs), and the like. I/O devices access system memory in a virtual memory space, but the system includes only a limited amount of physical memory, necessitating address translation from virtual addresses to physical addresses. Virtual addressing ensures that an I/O device cannot directly read/write arbitrary sections of the physical memory for which the I/O device does not have permission. Address translation requests from these devices are serviced by an input/output memory management unit (IOMMU).

The IOMMU is responsible for performing virtual-to-physical address translations for I/O devices such as NICs or GPUs. Thus, the IOMMU is a shared resource across all I/O devices in a system. In highly integrated SoCs, independent streams of address translation requests from different I/O devices may compete for resources of the IOMMU. It is even possible for one I/O device with high bandwidth requirements to starve other devices of address translation services by flooding the IOMMU. Even worse, it could be possible for malicious software to mount a denial-of-service (DoS) attack on other devices via overloading the IOMMU with requests.

BRIEF DESCRIPTION OF THE DRAWINGS

FIG. 6 illustrates in table form an example IOMMU device table that tracks attributes of I/O devices for use by IOMMU of FIG. 2 according to some embodiments.

Figure 1:
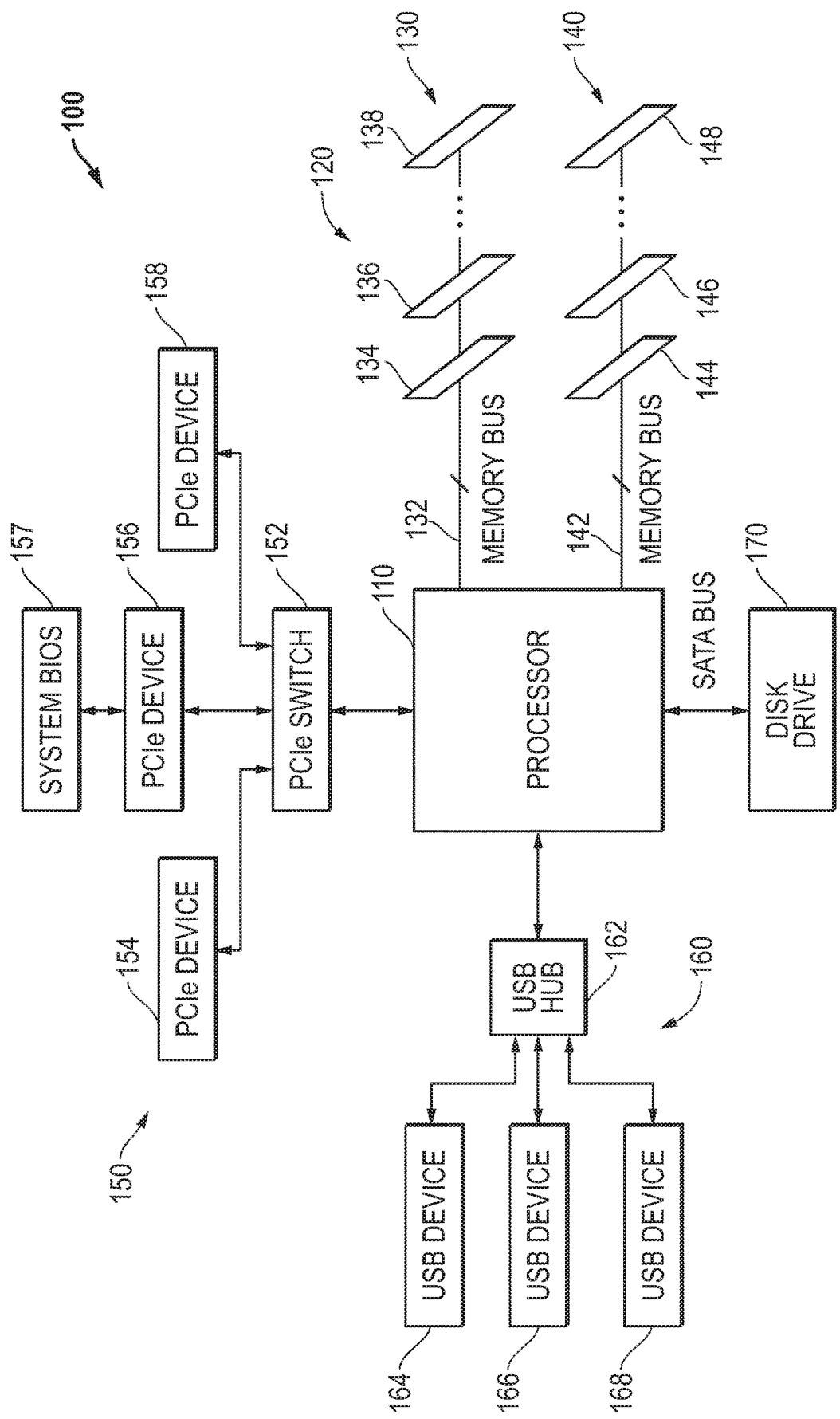
FIG. 1 illustrates in block diagram form a data processing system according to some embodiments.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well. Additionally, the terms remap and migrate, and variations thereof, are utilized interchangeably as a descriptive term for relocating.

DETAILED DESCRIPTION OF ILLUSTRATIVE EMBODIMENTS

As will be described below in one form, a data processing system includes a memory, a plurality of input/output devices, and an input/output memory management unit (IOMMU). The IOMMU is coupled to the memory. The IOMMU allocates a hardware resource, from among a plurality of hardware resources, to receive an address translation request for memory access. The address translation request is from an input/output device from among the plurality of input/output devices. The IOMMU detects address translation requests from the plurality of input/output devices. The IOMMU reorders the address translation requests such that an order of dispatching an address translation request is based on a policy. The policy is associated with the input/output device that is requesting the memory access. Further, the IOMMU selectively allocates a hardware resource from among the plurality of hardware resources to the input/output device. The allocating is based on the policy that is associated with the input/output device in response to the reordering.

In another form, an IOMMU includes a plurality of level one translation lookaside buffers, a plurality of hardware resources, and an IOMMU driver. The level one translation lookaside buffers are coupled to respective input/output devices. The IOMMU driver is coupled to the plurality of hardware resources for allocating a hardware resource to receive an address translation request from an input/output device based on an attribute of the input/output device. The IOMMU driver triggers the IOMMU to dispatch the address translation request to a respective one of the hardware resources, such that an order of dispatching is based on an attribute associated with the input/output device.

In still another form there is described a method for allocating a hardware resource to an input/output queue based on an attribute of the input/output device that includes receiving, at an IOMMU, an address translation request from an input/output device. In response to detecting an address translation in a first translation lookaside buffer hierarchy, a memory is accessed to translate a virtual address of the address translation request. In response to not detecting the address translation in the first translation lookaside buffer hierarchy, the input/output device is allocated to use a selected hardware resource from among a plurality of hardware resources, based on an attribute of the input/output device.

FIG. 1 illustrates in block diagram form a data processing system 100 according to some embodiments. Data processing system 100 includes generally a data processor 110, a memory system 120, a peripheral component interconnect express (PCIe) system 150, a universal serial bus (USB) system 160, and a disk drive 170. Data processor 110 operates as the central processing unit (CPU) of data processing system 100 and provides various buses and interfaces useful in modern computer systems. These interfaces include two double data rate (DDRx) memory channels, a PCIe root complex for connection to a PCIe link, a USB controller for connection to a USB network, and an interface to a Serial Advanced Technology Attachment (SATA) mass storage device.

Memory system 120 includes a memory channel 130 and a memory channel 140. Memory channel 130 includes a set of dual inline memory modules (DIMMs) connected to a memory bus 132, including representative DIMMs 134, 136, and 138 that in this example correspond to separate ranks. Likewise, memory channel 140 includes a set of DIMMs connected to a memory bus 142, including representative DIMMs 144, 146, and 148.

PCIe system 150 includes a PCIe switch 152 connected to the PCIe root complex in data processor 110, a PCIe device 154, a PCIe device 156, and a PCIe device 158. PCIe device 156 in turn is connected to a system basic input/output system (BIOS) memory 157. System BIOS memory 157 can be any of a variety of non-volatile memory types, such as read-only memory (ROM), flash electrically erasable programmable ROM (EEPROM), and the like.

USB system 160 includes a USB hub 162 connected to a USB master in data processor 110, and representative USB devices 164, 166, and 168 each connected to USB hub 162. USB devices 164, 166, and 168 could be devices such as a keyboard, a mouse, a flash EEPROM port, and the like.

Disk drive 170 is connected to data processor 110 over a SATA bus and provides mass storage for the operating system, application programs, application files, and the like. Data processing system 100 is suitable for use in modern computing applications by providing memory channel 130 and memory channel 140. Each of memory channels 130 and 140 can connect to DDR memories such as DDR version 4 (DDR4), low power DDR4 (LPDDR4), graphics DDR version five (gDDR5), and high bandwidth memory (HBM), and can be adapted for future memory technologies. These memories provide high bus bandwidth and high-speed operation. As will be explained in more detail below, data processor 110 includes multiple input/output devices that access data in memory system 120 using an input/output memory management unit (IOMMU) that allocates hardware resources using quality-of-service policies that are associated with each particular input/output device.

Figure 2:
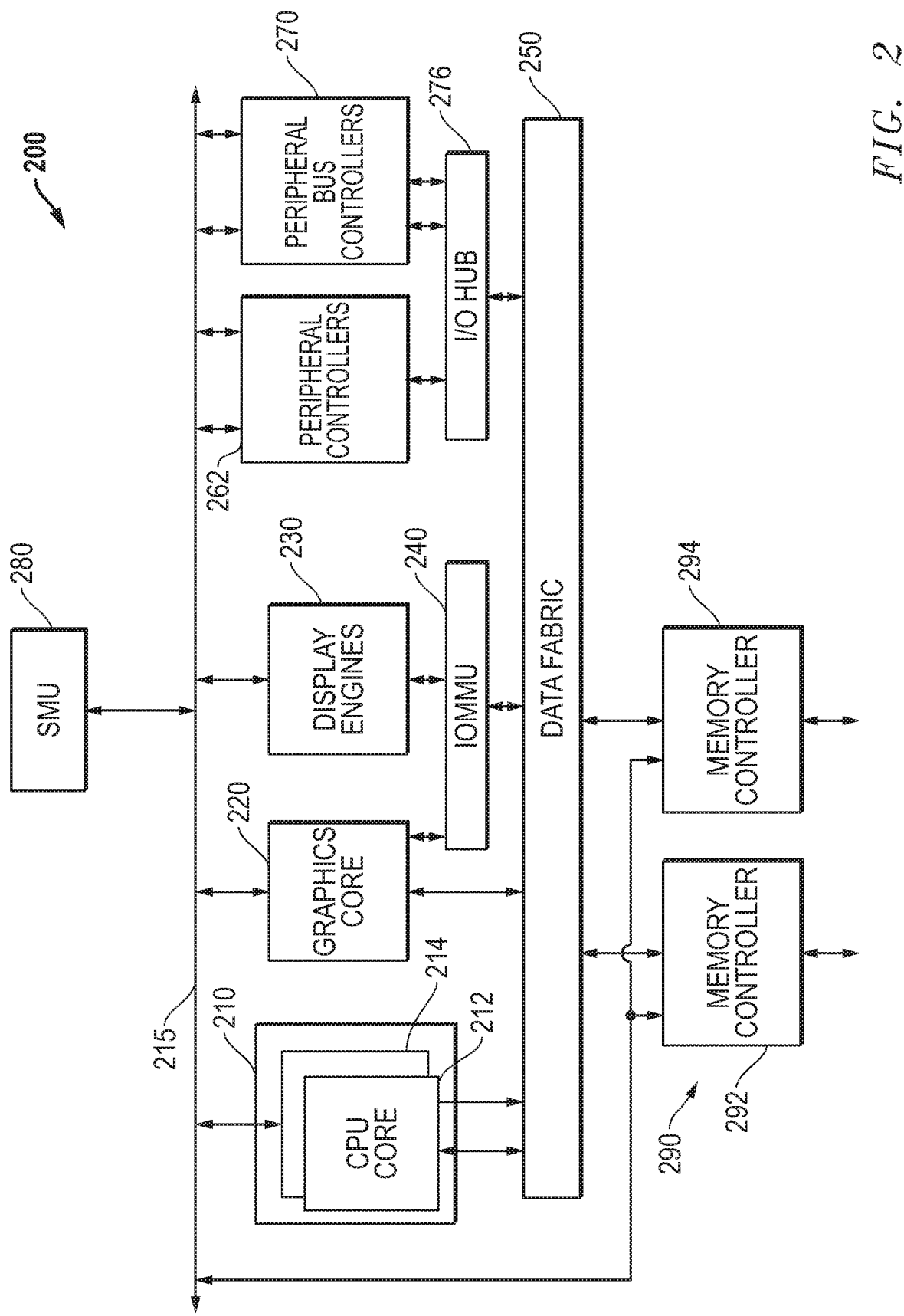
FIG. 2 illustrates in block diagram form a data processor suitable for use in the data processing system of FIG. 1 according to some embodiments.

FIG. 2 illustrates in block diagram form a data processor 200 suitable for use in data processing system 100 of FIG. 1 according to some embodiments. Data processor 200 includes generally a central processing unit (CPU) core complex 210, a graphics core 220, a set of display engines 230, an input/output memory management unit (IOMMU) 240, a data fabric 250, a set of peripheral controllers 262, a set of peripheral bus controllers 270, an input/output hub 276, a system management unit (SMU) 280, and a set of memory controllers 290 (memory controller 292 and 294).

CPU core complex 210 includes a CPU core 212 and a CPU core 214. In this example, CPU core complex 210 includes two CPU cores, but in other embodiments CPU core complex can include an arbitrary number of CPU cores. Each of CPU cores 212 and 214 is bi-directionally connected to a system management network (SMN) 215, which forms a control fabric, and to data fabric 250, and is capable of providing memory access requests to data fabric 250. Each of CPU cores 212 and 214 may be unitary cores, or may further be a core complex with two or more unitary cores sharing certain resources such as caches.

Graphics core 220 is a high-performance graphics processing unit (GPU) capable of performing graphics operations such as vertex processing, fragment processing, shading, texture blending, and the like in a highly integrated and parallel fashion. Graphics core 220 is bidirectionally connected to SMN 215 and to IOMMU 240, and is capable of providing memory access requests to data fabric 250 via IOMMU 240. In this regard, data processor 200 may either support a unified memory architecture in which CPU core complex 210 and graphics core 220 share the same memory space, or a memory architecture in which CPU core complex 210 and graphics core 220 share a portion of the memory space, while graphics core 220 may also use a private graphics memory not accessible by CPU core complex 210. Optionally, other processor types may be bi-directionally connected to SMN 215 and to IOMMU 240 for providing memory access requests to data fabric 250 via IOMMU 240. For example, other processor types may include a digital signal processor (DSP), as well as special purpose accelerators.

Display engines 230 render and rasterize objects generated by graphics core 220 for display on a monitor. Graphics core 220 and display engines 230 are bi-directionally connected to a common IOMMU 240 for uniform translation into appropriate addresses in memory system 120, and IOMMU 240 is bi-directionally connected to data fabric 250 for generating such memory accesses and receiving read data returned from the memory system.

IOMMU 240 is a memory management unit that performs virtual-to-physical address translations for input/output devices to access a common memory space. IOMMU 240 receives address translation requests for memory accesses from devices such as graphics core 220 and display engines 230 and provides translated physical accesses either from previous translations stored in internal translation lookaside buffers (TLBs) or from walking page tables in memory system 120.

Data fabric 250 can include a switch, such as a crossbar switch, for routing memory access requests and memory responses between any memory accessing agent and memory controllers 290. It also includes a system memory map, defined by BIOS, for determining destinations of memory accesses based on the system configuration, as well as buffers for each virtual connection.

Peripheral controllers 262 may include a USB controller and a SATA interface controller These two controllers are merely exemplary of peripheral controllers that may be used in data processor 200. Peripheral controllers 262 are bi-directionally connected to I/O hub 276.

Peripheral bus controllers 270 may include a system controller or "Southbridge" (SB) and a PCIe controller. Peripheral bus controllers 270 are bi-directionally connected to I/O hub 276. I/O hub 276 is also bi-directionally connected to data fabric 250.

SMU 280 is a local controller that controls the operation of the resources on data processor 200 and synchronizes communication among them. SMU 280 manages power-up sequencing of the various processors on data processor 200 and controls multiple off-chip devices via reset, enable and other signals. SMU 280 includes one or more clock sources not shown in FIG. 2, such as a phase locked loop (PLL), to provide clock signals for each of the components of data processor 200. SMU 280 also manages power for the various processors and other functional blocks, and may receive measured power consumption values from CPU cores 212 and 214 and graphics core 220 to determine appropriate power states.

Figure 3:
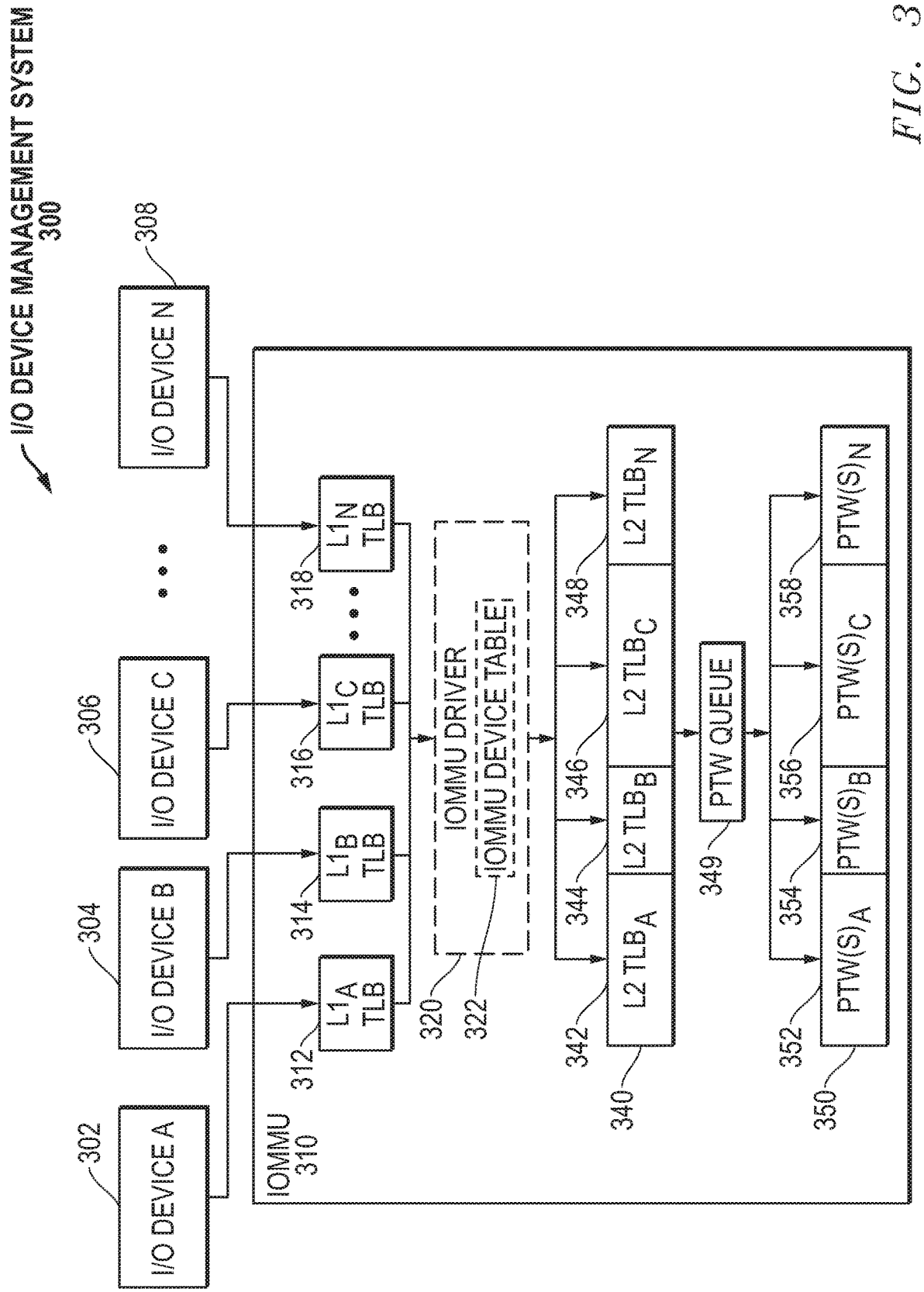
FIG. 3 illustrates in block diagram form an input/output (I/O) device management system for use in the data processor of FIG. 2 according to some embodiments.

FIG. 3 illustrates in block diagram form a I/O device management system 300 for use in the data processor of FIG. 2. I/O device management system 300 generally includes I/O devices 302, 304, 306, and 308 and IOMMU 310.

IOMMU 310 is connected to I/O devices 302, 304, 306, and 308 for receiving address translation requests from I/O devices 302, 304, 306, and 308. In one embodiment I/O devices 302, 304, 306, and 308 form a heterogeneous set of I/O devices, where each I/O device has different characteristics and provides different functionality for data processing system 100. IOMMU 310 includes a group of level one (L1) translation lookaside buffers (TLBs) 312, 314, 316, and 318, a set of level two (L2) TLBs 340, a page table walker (PTW) queue 349, and a set of page table walkers 350. PTWs 350 include representative PTWs 352, 354, 356, and 358. Also shown in FIG. 3 is an IOMMU device driver 320 having an associated IOMMU device table 322. Because IOMMU driver 320 is implemented in software and IOMMU device table 322 is stored outside of IOMMU 310, they are shown in FIG. 3 as dashed boxes. In other embodiments, IOMMU driver 320 and IOMMU device table 322 could be replaced with hardware circuitry and registers to implement the programmable features of IOMMU 310.

Each of the group of L1 TLBs 312, 314, 316, and 318 includes an input for receiving address translation requests from a respective one of I/O devices 302, 304, 306, and 308, and an output. IOMMU driver 320 can be implemented using software, a dedicated hardware circuit, or some combination of software and hardware, and is utilized to configure and manage IOMMU 310 when IOMMU 310 receives address translation requests from the group of L1 TLBs 312, 314, 316, and 318. Further IOMMU driver 320 configures IOMMU 310 to output translated addresses. IOMMU driver 320 has an associated IOMMU device table 322 for monitoring attributes of I/O devices 302, 304, 306, and 308.

L2 TLB 340 is virtually partitioned for use by a respective I/O device based on a policy associated with the I/O device. For example, L2 TLB 340 is partitioned as a group of L2 TLB portions 342, 344, 346, and 348. L2 TLB 340 has an input for receiving address translation requests that are selected by IOMMU driver 320, an output (not shown in FIG. 3) for providing successfully translated addresses to memory, and an output for providing address translation requests that miss in L2 TLB portions 342, 344, 346, and 348 to PTW queue 349. PTW queue 349 sequentially receives address translation requests that miss in the group of L2 TLB portions 342, 344, 346, and 348. Address translation requests are selectively dispatched from PTW queue 349 to PTWs 352, 354, 356, and 358 associated with the source of the translation request among I/O devices 302, 304, 306, and 308. The number of PTWs in PTW queue 349 is allocated based on attributes of I/O devices 302, 304, 306, and 308.

Known IOMMUs perform page table walks in memory using a first-come, first-serve protocol, using a first-in, first-out (FIFO) queue. One problem is that one I/O device can consume most or all of the hardware resources of IOMMU 310, starving other I/O devices. For example, I/O device 302 may be a greedy device, such as a GPU. In this case it can consume most or all of L2 TLB 340 and most or all of PTWs 350 with address translation requests. Therefore I/O devices 304, 306, and 308 would be starved of address translation bandwidth.

To decrease strain on the memory system and ensure address translation requests from several I/O devices receive access to the memory, IOMMU driver 320 allocates a specified percentage (0-100%) of the hardware resources (TLBs 340 and PTWs 350) of IOMMU 310 to each I/O device (302, 304, 306, 308) based on predetermined and/or dynamically determined memory access needs of the respective I/O device. Allocating a percentage of the hardware resources enables IOMMU driver 320 to provide a fairer distribution of address translation resources to the I/O devices. IOMMU 310 detects the address translation requests from the group of I/O devices 302, 304, 306, and 308. IOMMU 310 receives the address translation requests for memory accesses from I/O devices 302, 304, 306, and 308. IOMMU 310 includes a TLB hierarchy, such as group of L1 TLBs 312, 314, 316, and 318 that stores recent physical address translations. When the address translation is stored in the group of L1 TLBs 312, 314, 316, and 318, the physical address is sent to the memory channel and/or is sent to the requesting device (302, 304, 306, and 308) when the requesting device includes a TLB. When the address translation misses at an L1 TLB (312), IOMMU 310 attempts to obtain the address translation using allocated hardware resources.

Instead of distributing each address translation request to L2 TLB 340 in a first-come, first-serve order, IOMMU driver 320 identifies a percentage of the hardware resources each I/O device is allotted as provided by the IOMMU device table 322. In one exemplary embodiment, known as source prioritization, each I/O device 302, 304, 306, and 308 has an entry in IOMMU device table 322 that identifies a percentage of address translation resources that the corresponding I/O device is allotted to utilize.

IOMMU driver 320 exposes an application programming interface (API) that enables a respective I/O device (302, 304, 306, and 308) to request a predetermined percentage of hardware resources. IOMMU driver 320 can honor the percentage request, or adjust the percentage of allotted hardware resources based on attributes associated with the respective I/O device. IOMMU driver 320 updates IOMMU device table 322 accordingly.

IOMMU 310 tracks how many L2 TLBs 340 are performing translations from a respective I/O device 302, 304, 306, and 308. Likewise, IOMMU 310 tracks how many PTWs 352, 354, 356, and 358 are performing page table walks in memory and in IOMMU 310 for each I/O device 302, 304, 306, and 308. In this way IOMMU 310 can determine how much each of I/O devices 302, 304, 306, and 308 have utilized the respective hardware resource and adjust the allocation of resources accordingly.

Figure 4:
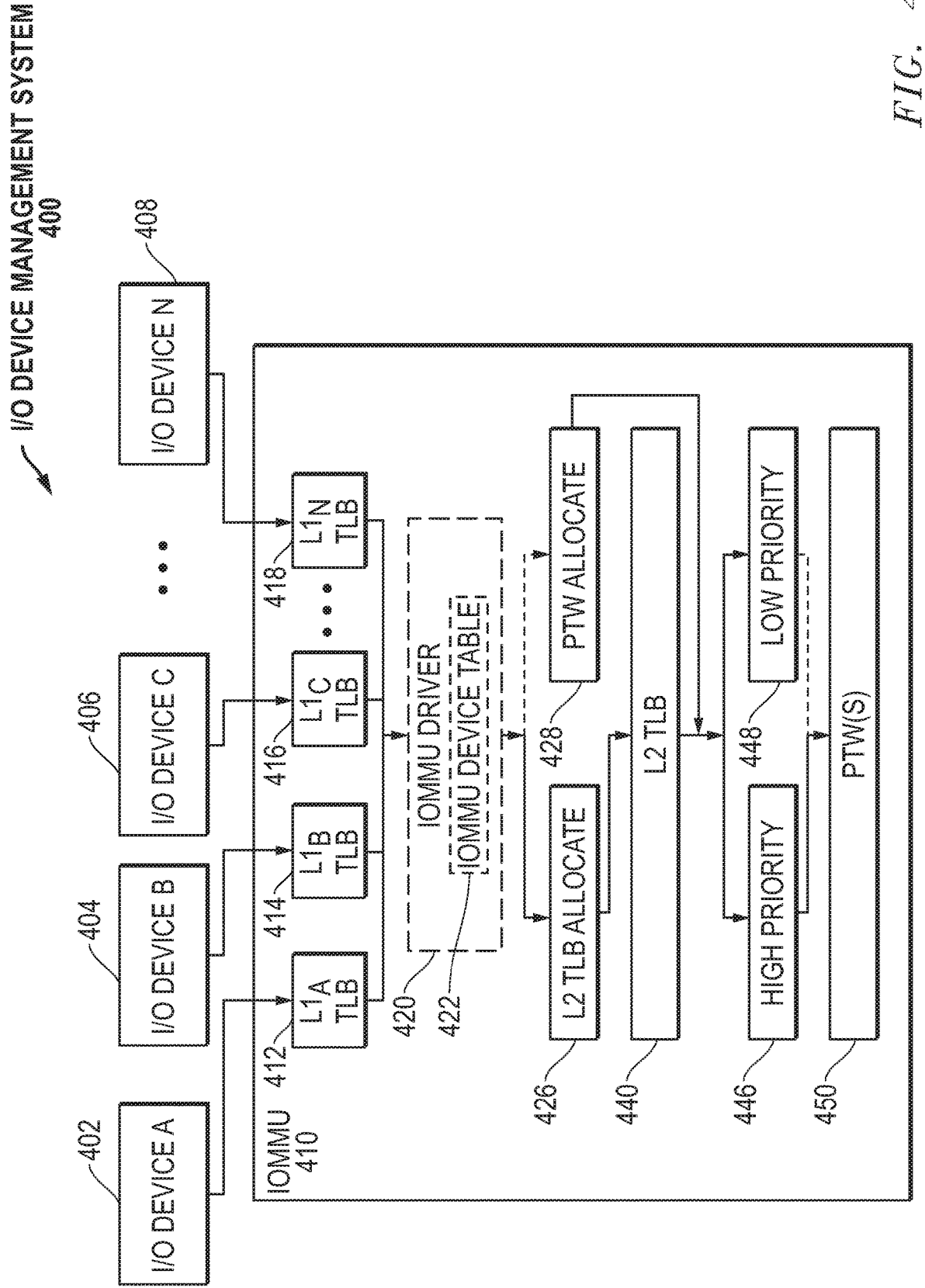
FIG. 4 illustrates in block diagram form a I/O device management system for use in the data processor of FIG. 2 according to some embodiments.

FIG. 4 illustrates in block diagram form a I/O device management system 400 for use in the data processor of FIG. 2 according to some embodiments. I/O device management system 400 generally includes I/O devices 402, 404, 406, and 408 and IOMMU 410.

IOMMU 410 is connected to I/O devices 402, 404, 406, and 408 for receiving address translation requests from I/O devices 402, 404, 406, and 408. IOMMU 410 includes a group of L1 TLBs 412, 414, 416, and 418 that have an input respectively connected to an output of I/O devices 402, 404, 406, and 408, an output for providing address translations to memory, and an output for providing translation requests that missed in a respective L1 TLB, as configured by IOMMU driver 420. IOMMU driver 420 communicatively connects to an IOMMU device table 422. Further, IOMMU 410 includes a L2 TLB allocate queue 426 and a PTW allocate queue 428 that each receive address translations as configured by IOMMU driver 420, at an input. L2 TLB allocate queue 426 has an output that connects to a L2 TLB 440. PTW allocate queue 428 has an output that dispatches address translation requests to a high priority queue 446 and a low priority queue 448. Further, L2 TLB 440 selectively dispatches address translation requests to high priority queue 446 and low priority queue 448. Each of high priority queue 446 and low priority queue 448 include outputs that dispatch address translation requests to a group of PTW(s) 450.

In an embodiment, known as static partitioning, IOMMU driver 420 assigns hardware resources, such as L2 TLB 440 to I/O devices 402, 404, 406, and 408, based on a priority policy. IOMMU driver 420 assigns a priority policy to I/O devices 402, 404, 406, and 408. IOMMU driver 420 delegates each of I/O devices 402, 404, 406, and 408 as a high priority device or a low priority device. IOMMU driver 420 distinguishes the respective I/O device 402, 404, 406, and 408 as having the high priority or low priority attribute in IOMMU device table 422. Any page table walk requests generated due to address translation needs of a high-priority device is are put in high-priority queue 446. Similarly, any page table walk requests generated due to address translation needs of a low-priority device are put in low-priority queue 448.

Accordingly, in response to a PTW from among the group of PTWs 450 becoming available, IOMMU driver 420 triggers allocation of the next address translation request in high priority queue 446 to PTWs 450. IOMMU driver 420 allocates an address translation request from low priority queue 448 in response to the emptying of high priority queue 446.

IOMMU driver 420 determines whether an earlier address translation request is waiting in low priority queue 448 for greater than a predetermined length of time and in response to an address translation request waiting for greater than a predetermined length of time, triggers PTW 450 to select the earlier address translation request from low priority queue 448, or the address translation request is moved from low priority queue 448 to high priority queue 446. In another embodiment, IOMMU driver 420 honors a request from an I/O device (402) to issue an address translation request to a priority queue (448) that is lower than the priority queue (446) of assignment.

IOMMU driver 420 assigns a priority policy to a respective I/O device based on an attribute and/or missing attribute of the I/O device. IOMMU driver 420 assigns an "allocate" (L2 TLB allocate queue 426) or "no-allocate" (PTW allocate queue 428) policy and respectively stores this information in IOMMU device table 422 for the associated device. This policy controls whether an address translation request for a respective I/O device 402, 404, 406, and 408 is cached in a shared L2 TLB, L2 TLB 440, or allocated to PTW(s) 450. This policy is particularly useful when IOMMU 410 is handling address translation requests from I/O devices that already have large TLBs, such as a GPU. For example, if a GPU request misses in its own TLB there is almost zero probability that it would hit in L2 TLB 440 which is typically much smaller than a TLB of a GPU. Alternatively, the capacity of L2 TLB 440 can be valuable for I/O devices such as a network interface card (NIC) or a hard disk drive (HDD) controller which may not have its own TLB and relies solely on L2 TLB 440. Thus, for increased performance, IOMMU driver 420 assigns a "no-allocate", or allocate to PTW (428) attribute for I/O devices like a GPU, while assigning an "allocate" for I/O devices like a NIC.

Each I/O device 402, 404, 406, and 408 can be assigned a policy that is associated with L2 TLB 440, as well as a policy that is associated with PTW(s) 450. Applying an allocate or no allocate policy to each of I/O devices 402, 404, 406, and 408 enables the memory to receive memory translation requests from high-throughput I/O devices like a GPU and from lower throughput devices without the high-throughput I/O devices consuming all hardware resources in IOMMU 410. Assigning both an allocation policy per device and priority per I/O device decreases address translation request congestion at any one hardware resource and maintains a balance for high-throughput address translation needs.

Figure 5:
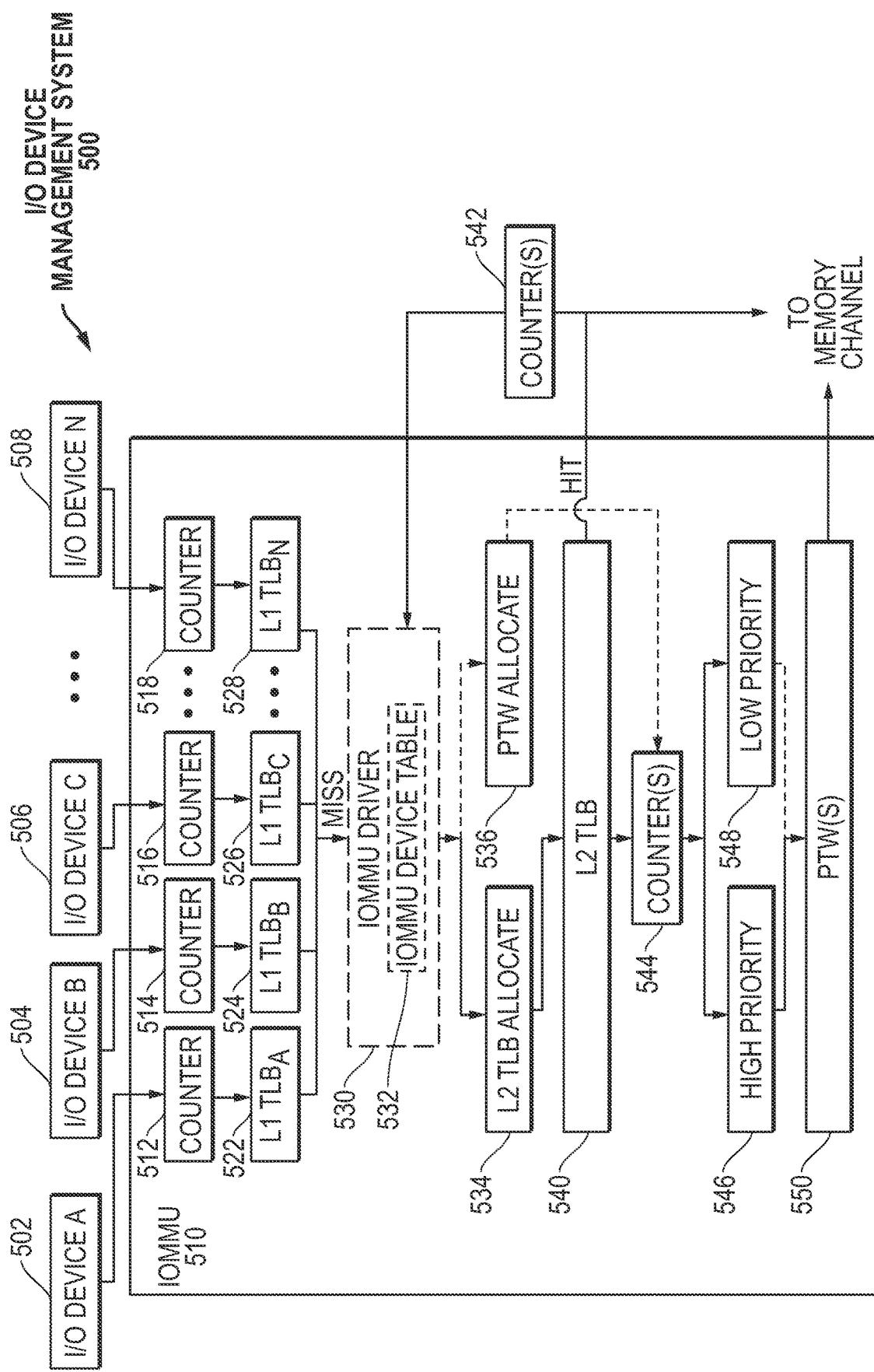
FIG. 5 illustrates in block diagram form a I/O device management system for use in the data processor of FIG. 2 according to some embodiments.

FIG. 5 illustrates in block diagram form an I/O device management system 500 for use in the data processor of FIG. 2 according to some embodiments. I/O device management system 500 generally includes I/O devices 502, 504, 506, and 508 and IOMMU 510.

IOMMU 510 is connected to I/O devices 502, 504, 506, and 508 for receiving address translation requests from I/O devices 502, 504, 4506, and 508. IOMMU 510 includes a group of counters 512, 51, 516, and 518 that respectively have inputs connected to I/O devices 502, 504, 506, and 508 and outputs connected respectively connected to a group of L1 TLBs 522, 524, 526, and 528. L1 TLBs 522, 524, 526, and 528 each have outputs that are configured by IOMMU driver 530. IOMMU driver 530 communicatively connects to an IOMMU device table 532. IOMMU driver 530 configures IOMMU 510 to receive address translation requests that miss in the L1 TLBs 522, 524, 526, and 528. IOMMU driver 530 monitors counts of address translation hits in the memory, and configures IOMMU 510 to allocate address translation requests to a L2 TLB allocate queue 534 and a PTW allocate queue 536. L2 TLB allocate queue 534 has an output that connects to an input of L2 TLB 540. L2 TLB 540 has an output connected to counters 544, which tracks the number of misses in L2 TLB 540, and an output for outputting hits in L2 TLB 540 to a memory. Counters 544 are connected to high priority queue 546 and a low priority queue 548. Each of high priority queue 546 and low priority queue 548 include outputs that dispatch address translation requests to a group of PTW(s) 550.

In an embodiment, known as hardware-determined quality of service, IOMMU driver 530 adjusts the allocation of address translations requests from I/O devices to PTW 550 based on busy cycles as determined by counters. IOMMU 510 receives address translation requests from I/O devices 502, 504, 506, and 508. Counters 512, 514, 516, and 518 respectively monitor the address translation request from each of I/O devices 502, 504, 506, and 508. Utilizing counters 512, 514, 516, 518, and 544, IOMMU 510 monitors what fraction of busy cycles for PTW 550 are due to servicing address translation requests from which I/O device (502, 504, 506, and 508). When this fraction of address translation reaches a pre-determined threshold of serviced address translations (e.g., 80%), any new requests from the respective I/O device (502, 504, 506, and 508) is assigned to low priority queue 548. Therefore, new requests from the respective I/O device are serviced only if there are no requests pending from another device.

Further, IOMMU 510 partitions the hardware resources of L2 TLB 540 based on utility. For example, IOMMU 510 utilizes counters 544 and 552 to monitor the hit rate of address translations at L2 TLB 540 for each of I/O devices 502, 504, 506, and 508. This measurement can be performed periodically over a predetermined time period (e.g., every 100 microseconds). For example, a respective I/O device (502, 504, 506, and 508) has a hit rate below a predetermined threshold at the end of a predetermined time period. Responsively, each of the address translation requests associated with the respective I/O device is allocated to L2 TLB 540 with low priority for a next predetermined time period. Similarly, address translation requests from I/O devices (502, 504, 506, and 508) having a hit rate that is above a predetermined threshold are allocated to L2 TLB 540 with a higher probability.

Utilizing counters (512, 514, 516, and 518) to monitor the hit rate of address translation requests enables IOMMU 510 to allocate resources based on a policy that can be implemented entirely by IOMMU hardware circuitry.

FIG. 6 illustrates in table form an example IOMMU device table 600 that tracks attributes of I/O devices for use by IOMMU 240 of FIG. 2 according to various embodiments. Each I/O device has a corresponding entry in IOMMU device table 600. The entries have a common set of fields such as attributes A-N (604-606), hardware resource A percentage (%) 608, hardware resource B % 610, and L2 TLB hit rate 612. In one embodiment, IOMMU device table 600 is an extension of an existing IOMMU device table, and attributes of I/O devices are added to reserve fields of the existing IOMMU device table. In addition to utilizing attributes that are added to the reserve fields of an IOMMU device table, such as IOMMU device table 600, an IOMMU driver (320, 420, 530) can utilize existing attributes of an IOMMU device table to determine the policy for allocating hardware resources to a respective I/O device. Further, the IOMMU driver can enable the IOMMU to override entries associated with an IOMMU device table.

Some or all of the policies illustrated in FIGS. 3-5 may be governed by instructions that are stored in a computer readable storage medium and that are executed by at least one processor. Each of the operations shown in FIGS. 3-5 may correspond to instructions stored in a non-transitory computer memory or computer readable storage medium. In various embodiments, the non-transitory computer readable storage medium includes a magnetic or optical disk storage device, solid-state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Although the present invention has been described with reference to preferred embodiments, workers skilled in the art will recognize that changes may be made in form and detail without departing from the scope of the invention.

What is claimed is:

1. A data processing system, comprising:
    a plurality of input/output devices;
    an input/output memory management unit (IOMMU) coupled to the plurality of input/output devices and having a plurality of hardware resources that the IOMMU uses to translate address translation requests received from the plurality of input/output devices to physical addresses, wherein the IOMMU:
        statically allocates percentages of the plurality of hardware resources from among the plurality of hardware resources to corresponding ones of the plurality of input/output devices based on predetermined memory access needs of the corresponding ones of the plurality of input/output devices; and
        in response to receiving a first address translation request from a first input/output device, uses a first percentage of the hardware resources statically allocated to the first input/output device to translate a first virtual address of the first address translation request to a first physical address.

2. The data processing system of claim 1, wherein each of the plurality of hardware resources comprises a level two (L2) translation lookaside buffers (TLB).

3. The data processing system of claim 1, wherein each of the plurality of hardware resources comprises a hardware page table walkers (PTW).

4. The data processing system of claim 1, wherein:
    the data processing system further comprises a memory; and
    the data processing system further provides the physical addresses to the memory.

5. The data processing system of claim 1, wherein the IOMMU statically allocates percentages of the plurality of hardware resources using a device table.

6. The data processing system of claim 5, wherein the IOMMU uses a device driver to access the device table to configure the IOMMU to allocate the percentages of the plurality of hardware resources.

7. The data processing system of claim 1, wherein the IOMMU statically allocates percentages of the plurality of hardware resources using registers in the IOMMU.

8. A data processing system, comprising:
    a plurality of input/output devices;
    an input/output memory management unit (IOMMU) coupled to the plurality of input/output devices and having a plurality of hardware resources that the IOMMU uses to translate virtual addresses received from the plurality of input/output devices to physical addresses, and a high priority queue and a low priority queue coupled to the plurality of hardware resources, wherein the IOMMU:
        assigns each of the plurality of input/output devices to a corresponding one of the high priority queue and the low priority queue based on predetermined memory access needs of the corresponding ones of the plurality of input/output devices; and
        in response to receiving an address translation request from a first input/output device, uses an assigned one of the high priority queue and the low priority queue to dispatch the address translation request to one of the plurality of hardware resources, wherein the IOMMU allocates address translation requests from the high priority queue to the plurality of hardware resources in preference to address translation requests from the low priority queue.

9. The data processing system of claim 8, wherein the IOMMU allocates address translation requests from the low priority queue to one of the plurality of hardware resources in response to an emptying of the high priority queue.

10. The data processing system of claim 8, wherein the IOMMU allocates address translation requests from the high priority queue to the plurality of hardware resources until less than a predetermined threshold of address translation requests remain in the high priority queue, wherein the IOMMU subsequently allocates at least one address translation request from the low priority queue to the plurality of hardware resources.

11. The data processing system of claim 10, wherein the IOMMU:
    determines whether an earlier address translation request is waiting in the low priority queue for greater than a predetermined length of time; and
    in response to determining whether the earlier address translation request is waiting in the low priority queue for greater than the predetermined length of time, triggers one of the plurality of hardware resources to select the earlier address translation request from the low priority queue.

12. The data processing system of claim 10, wherein the IOMMU:
    monitors allocations of the address translation requests to the plurality of hardware resources for each of the plurality of input/output devices;

based on utilization of the plurality of the plurality of hardware resources by an input/output device, allocates the address translation requests to the high priority queue until a utilization of the plurality of hardware resources reaches a predetermined threshold for the input/output device; and when the utilization of the plurality of hardware resources for the input/output device reaches the predetermined threshold, allocates further address translation requests from the input/output device to the low priority queue.

13. The data processing system of claim 8, wherein the hardware resources comprise hardware page table walkers (PTWs).

14. The data processing system of claim 8, wherein the plurality of hardware resources do not process address translation requests from the low priority queue until there are no entries in the high priority queue.

15. The data processing system of claim 8, wherein:
the data processing system further comprises a memory; and
the data processing system further provides the physical addresses to the memory.

16. A method for generating a physical address in response to an address translation request in an input/output memory management unit (IOMMU), comprising:
receiving address translation requests from a plurality of input/output devices;
statically allocating percentages of a plurality of hardware resources to corresponding ones of the plurality of input/output devices based on predetermined memory access needs of the corresponding ones of the plurality of input/output devices, wherein statically allocating comprises allocating a first percentage of the plurality of hardware resources to a first input/output device; and
receiving a first address translation request from the first input/output device; and
using the first percentage of the plurality of hardware resources allocated to the first input/output device to translate a first virtual address of the first address translation request to a first physical address.

17. The method of claim 16, wherein statically allocating the percentages of the plurality of hardware resources to the corresponding ones of the plurality of input/output devices comprises statically allocating percentages of a plurality of translation lookaside buffers (TLBs) to the corresponding ones of the plurality of input/output devices.

18. The method of claim 17, wherein statically allocating the percentages of the plurality of hardware resources to the corresponding ones of the plurality of input/output devices further comprises statically allocating percentages of a plurality of page table walkers to the corresponding ones of the plurality of input/output devices.

19. The method of claim 16, wherein statically allocating the percentages of the plurality of hardware resources to the corresponding ones of the plurality of input/output devices further comprises statically allocating percentages of a plurality of page table walkers to the corresponding ones of the plurality of input/output devices.

20. The method of claim 16, wherein statically allocating the percentages of the plurality of hardware resources to the corresponding ones of the plurality of input/output devices comprises determining the percentages by accessing a device tree stored in memory.

* * * * *